US007171864B2

(12) United States Patent
Schachter

(10) Patent No.: US 7,171,864 B2
(45) Date of Patent: Feb. 6, 2007

(54) METHOD FOR TESTING WRITING INSTRUMENTS

(75) Inventor: Friedrich Schachter, deceased, late of Vienna (AT); by David Schmitz, legal representative, London (GB); by Anne Schmitz, legal representative, Ottawa (CA)

(73) Assignee: Societe BIC, Clichy (FR)

( * ) Notice: Subject to any disclaimer, the term of this patent is extended or adjusted under 35 U.S.C. 154(b) by 0 days.

(21) Appl. No.: 10/874,153

(22) Filed: Jun. 21, 2004

(65) Prior Publication Data

US 2005/0034515 A1 Feb. 17, 2005

Related U.S. Application Data

(63) Continuation of application No. PCT/FR02/04527, filed on Dec. 23, 2002.

(30) Foreign Application Priority Data

Dec. 21, 2001 (EP) ................................ 01890347

(51) Int. Cl.
*B43K 15/02* (2006.01)
*B43K 31/00* (2006.01)
*G01N 21/00* (2006.01)

(52) U.S. Cl. .................. 73/865.9; 73/150 R; 73/865.3

(58) Field of Classification Search ............. 73/150 R, 73/865.3, 865.9; 408/208–220; D19/35–51
See application file for complete search history.

(56) References Cited

U.S. PATENT DOCUMENTS 2,300,107 A * 10/1942 Curado et al. ........... 73/150 R
4,580,438 A * 4/1986 Horand ...................... 73/12.03
4,753,546 A * 6/1988 Witz et al. .................. 401/258
5,170,047 A * 12/1992 Beauchamp et al. ........ 250/202
5,796,414 A * 8/1998 Sievert et al. ................ 347/19
6,075,070 A * 6/2000 Lin et al. .................... 523/161
6,082,920 A * 7/2000 Furukawa ................... 401/216
6,146,452 A * 11/2000 Takeuchi ................ 106/31.58

FOREIGN PATENT DOCUMENTS

DE 3123264 A1 9/1982
DE 19711698 A1 10/1997
FR 2491617 A * 4/1982
JP 4-8599 1/1992
JP 7-40697 2/1995

OTHER PUBLICATIONS

Minitek PSU 10 Universal Write Test Machine.

* cited by examiner

*Primary Examiner*—Hezron Williams
*Assistant Examiner*—David A. Rogers
(74) *Attorney, Agent, or Firm*—Jones Day

(57) ABSTRACT

The present invention concerns a method for controlling writing instruments, in particular ball-point pens, on paper, which consists in guiding the writing instrument relative to the paper plane in a repeated movement and displacing the paper in forward direction. The movement are thus coordinated so that the line obtained forms a meandering pattern which consists in rectilinear trajectories. The invention also concerns the device for implementing said method.

14 Claims, 3 Drawing Sheets

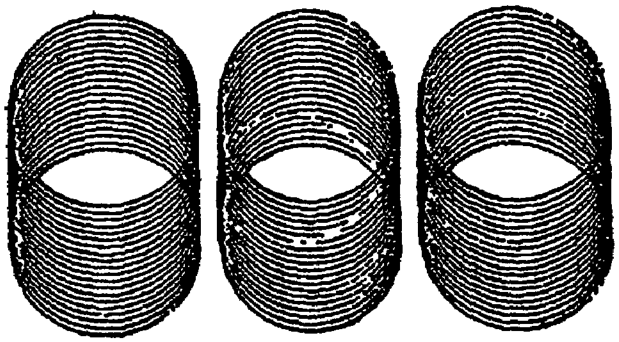
Fig. 1
PRIOR ART
Fig. 2
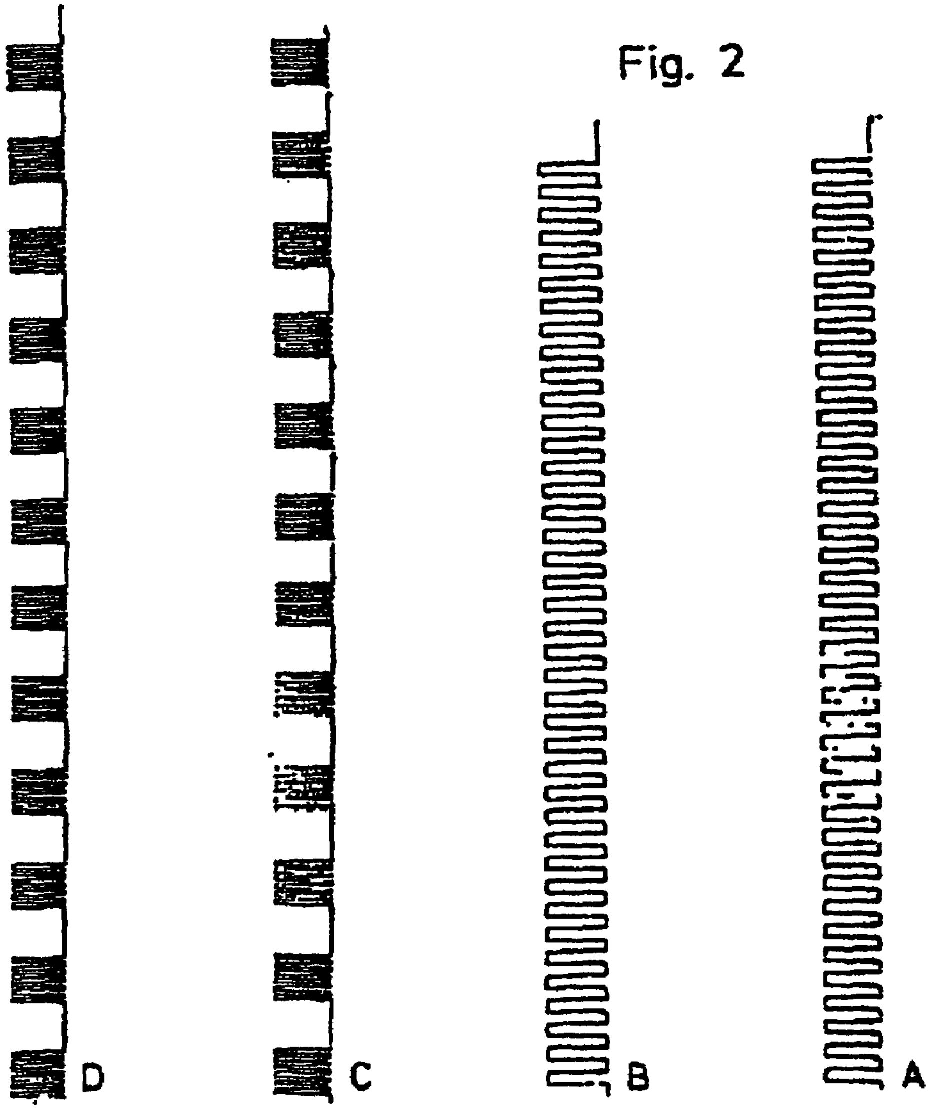

METHOD FOR TESTING WRITING INSTRUMENTS

CROSS REFERENCE TO RELATED APPLICATION

The present application is a continuation of United States National Stage designation of co-pending International Patent Application PCT/FR02/04527, filed on Dec. 23, 2002, which claims priority to European Patent Application No. 01890347.6, filed Dec. 21, 2001. The entire content of both these applications is expressly incorporated herein by reference thereto.

FIELD OF THE INVENTION

The present invention relates to a method for testing writing instruments, particularly ballpoint pens, on paper, in which the writing instrument is guided in a repetitive movement relative to the plane of the paper and the paper is displaced in a forward direction. The present invention also relates to a device for carrying out the method.

BACKGROUND OF THE INVENTION

Devices for testing writing instruments, in particular ballpoint pens, as known from the prior art, have the following structure: the device possesses a holder installed in such a way as to be able to pivot for a clamp which holds the ballpoint pen. The clamp is installed in the holder with a limited axial play and a small amount of radial play, usually 0.2 mm. Relative twisting is prevented by a dog.

During the test, the writing instrument is held at a predefined angle relative to the paper and optionally rotated about its longitudinal axis. The writing pressure is defined preferably by a weight.

The holder for the writing instrument (most of the time, several of these, preferably ten, are arranged one after the other) is installed in the test apparatus in such a way as to describe circular movements relative to the plane of the paper (10 to 90 rotations/minute are described in a circumference of 100 mm for example, which corresponds to writing speeds of 1 m/min to 9 m/min). The paper used to write on for test purposes is usually unwound from a reel and moved at a selectable speed underneath the holder, this being referred to as a forward movement. This produces a composite circular and linear movement, the forward movement being set small (preferably 0.17 [fine pattern] to 4.0 mm separation between each circle [coarse pattern]), in such a way that the divergence of the resulting circular shape is insignificant. To this composite movement there may be added, during the test operation, the movement of rotating the writing instrument about its own axis (preferably one rotation about its axis for every twenty circles with a fairly wide spacing between the circles, and one rotation about its axis for every one hundred circles in the case of a fine pattern).

The industry employs a number of different combinations of parameters of this type that make it a relatively simple process to observe, in the pattern obtained, the quality of the writing, particularly various anomalies, divergences and defects such as ovality, defective ink channels, in some circumstances defects of the writing ball, the suitability of the ballpoint pen ink used, etc., by observing a superposed interference pattern, the intensity of the lines or the intensity of the color.

The essential elements of this test method are standardized and described by the BSI in the documents PAS 40 (9.1.2) 1980 and DIN 16554 1982. The content of these two standards is incorporated in this application for reference.

The apparatus sold by Minitek Company under the name “PSU 10 Write Testing Machine” performs the above process. It has been used since 1962 by the major manufacturers and forms the technical basis for the standards. This apparatus and others using the same method test the production quality of some 100 million ballpoint pens every day around the world.

However, it has been found that this test, despite its usefulness, is not significant for all practical applications of writing instruments. In particular the regularity of the movement during the test does not coincide with the normal writing flow, because writing always includes making an abundance of spikes and angles and different accelerations. In addition, by its very nature, the test performed in accordance with the prior art results in superpositions of writing due to the superposition of the circular and forward movements. These superpositions of writing occur “wet on wet” because normal ballpoint pen inks can be smudged for up to about 20 seconds. These superpositions of writing complicate the evaluation of the test pattern, especially when using a densitometer with a small aperture.

SUMMARY OF THE INVENTION

The present invention provides a test device and test method for testing ballpoint pens that avoids the drawbacks of the known method when dealing with the spikes, angles, differing accelerations, and superpositions of writing.

These aims are achieved within the framework of the invention in that the ballpoint pen executes on the stationary paper a back and forth movement between two predefined extreme points and in that the forward movement of the paper takes place when the ballpoint pen is at or close to the extreme points.

In another aspect of the invention, the movement of the ballpoint pen transversely relative to the forward movement, and the forward movement of the paper take place alternately.

In practice, the test is performed in such a way that the ballpoint pen (or several ballpoint pens) is displaced back and forth on a carriage transversely relative to the forward movement of the paper between two predefined extreme points. It thus has, in the region of the extreme points, a minimal speed or remains at rest for a predetermined period of time at the extreme point. The forward movement of the paper takes place during this period. The movements are thus coordinated in such a way that the result is a meandering line made up of a series of rectilinear trajectories.

In this test also, the writing instrument may be rotated continuously about its longitudinal axis, while again maintaining a predetermined relationship between the number of rotations and the number of back and forth movements, e.g., one rotation for every 50 back and forth movements.

As even in the new test the writing instrument is held in a predefined and constant oblique position (60–70°) relative to the paper, the lines described by the movement of the carriage transversely relative to the forward direction of the paper represent upstrokes or downstrokes, while the lines described by the movement of the carriage in the forward direction of the paper equates to a sort of transverse stroke. Because of the controllable target acceleration which is also obtained by the modem technique of coming off the full stops, a dynamic way of writing in a repeatable manner is taken as the basis of the test, and the faults and problems of the writing instrument are recognized relatively simply from the thinner or thicker sections of lines "walking" across the pattern.

This allows anomalies to be precisely located in relation to different points of the nib.

The pattern obtained thus shows up structures that point to the geometrical irregularities in the nib, in the ball, etc.

BRIEF DESCRIPTION OF THE DRAWINGS

The invention is described more precisely on the basis of the drawing, in which:

FIG. 1 shows a test pattern in accordance with the prior art;

FIG. 2 shows a test pattern in accordance with the method of the invention;

DETAILED DESCRIPTION OF THE DRAWINGS

Figure 3:
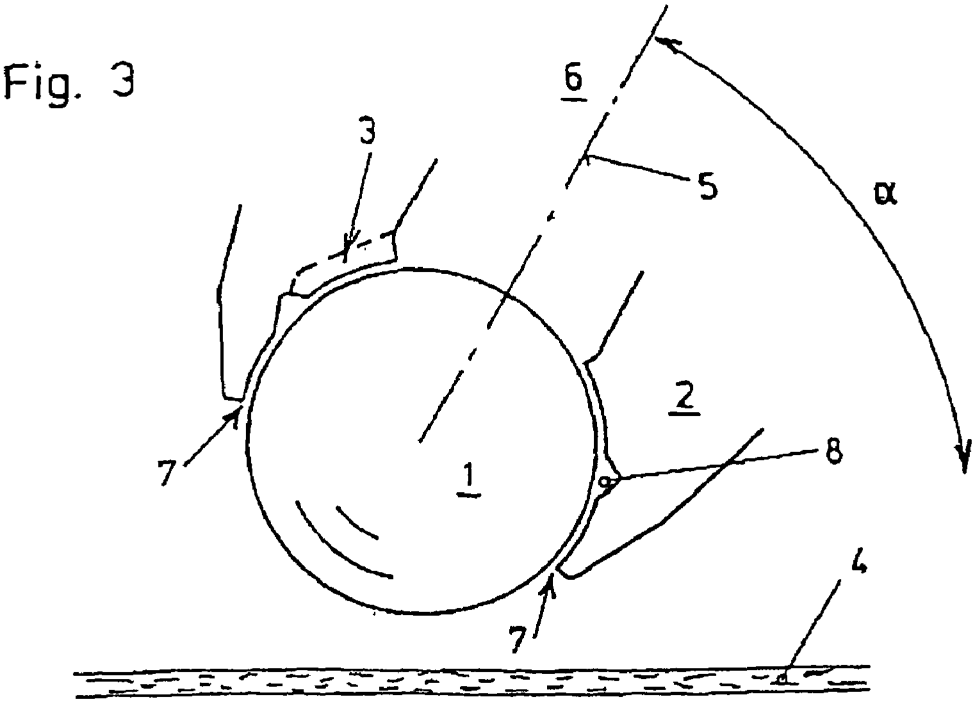
FIG. 3 shows a ballpoint pen nib at rest, held above the paper.

It should be emphasized for FIGS. 1 and 2 that copies or impressions of test patterns show structures nowhere near as clearly as the originals do. The two figures are attached to this description merely in order to explain the test method and not to illustrate the results of the test.

The (original) test patterns in accordance with the prior art produce significant interference phenomena. These occur because the defects classify themselves, due to the neighboring areas, into types that the human eye (but also semi-automatic or fully automatic optical recognition equipment) can distinguish very precisely and which can be associated by those skilled in the art with particular faults in the writing instruments.

As seen in FIG. 1, the superposition of the circular movement on the forward movement means that, with a relatively long configuration of the individual patterns but occupying their entire surface area, a multitude of writing superpositions develops along the edges of the patterns, these writing superpositions happening "wet on wet," which means that faults get covered over.

As FIG. 1 also shows, here it is almost exclusively regular and circular writing movements that are represented and thus tested, and yet the characteristics that predominate during practical writing, which relies on rapid and sudden changes of direction, such as angles or spikes, and also rapid changes of writing speed, receive little attention.

FIG. 2 shows a test pattern produced on a test substrate, such as paper, according to the method of the invention. The method of testing takes account of the characteristics that occur during practical writing and yields test patterns such as those illustrated. The test pattern shows a meandering line, which for the purposes of the invention means that the essentially straight-lined sections that extend one beneath the other practically at right angles are grouped to form a winding angular line.

There is a multitude of possible ways of producing this movement: it can be produced by carriages driven by electricity or, and this is preferred because of its reproducibility, by a cam-guided carriage. The forward movement of the paper is preferably brought about by a stepper motor which is activated or deactivated by, for example, the position of the carriage.

The direction of movement of the writing instrument and the forward direction of the paper may lie essentially normal to each other, one of top of the other.

The rotation of the nib of the ballpoint pen takes place, depending on requirements, continuously (FIGS. 2, A and B) while the back and forth movement of the carriage is actually taking place, or discontinuously (FIGS. 2, C and D) and only after a predefined number of back and forth movements of the carriage. A person skilled in the art with a knowledge of the invention will have no difficulty in choosing other drive means for the rotational movement. Each illustration A, B, C, and D corresponds to one complete rotation about the axis of the test sample. This explains why when these tests are repeated, the place where particular features appear also repeats.

An appropriately configured cam produces the succession of lines illustrated in FIG. 2, these lines being sufficiently rectilinear even though the cam itself does not stop at any point. This pattern shows very clearly the succession of upstrokes, transverse strokes, and downstrokes, to which the following should also be added, with particular reference to FIGS. 3 and 4.

Figure 4:
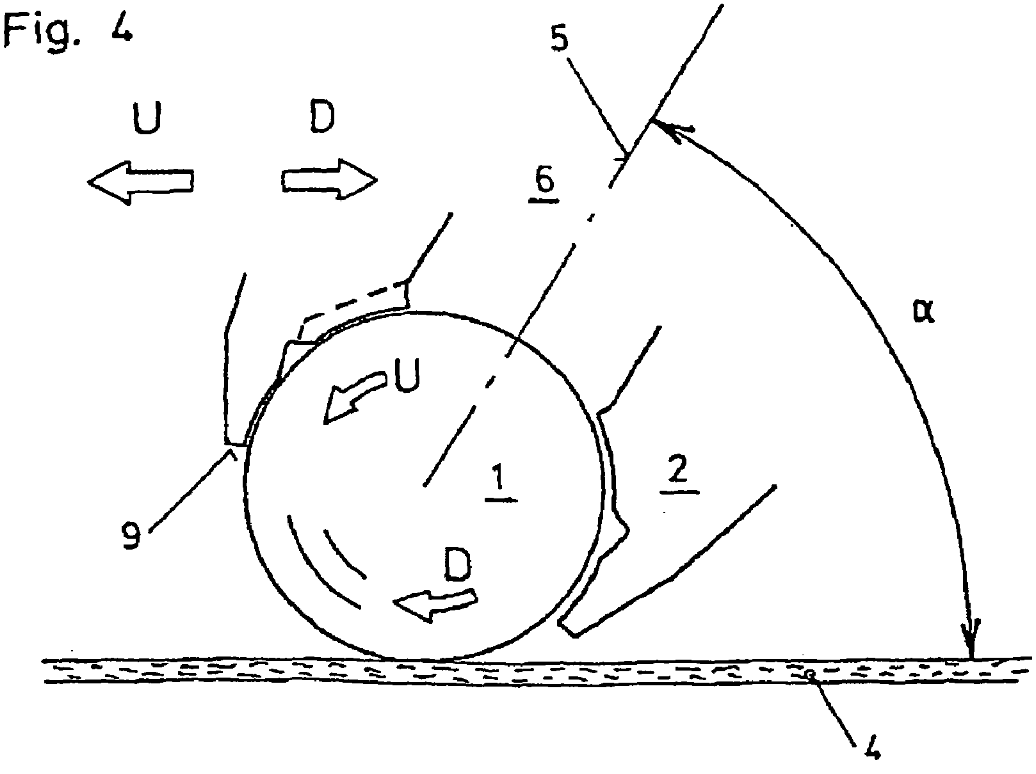
FIG. 4 shows the nib of the pen of FIG. 3 placed on the paper, with the ball displaced to permit ink to flow during writing.

The illustrations of FIGS. 3 and 4 are to be considered as being observed in the direction of forward movement of the paper, and the patterns illustrated in FIG. 2 are to be considered as extending in the direction of forward movement of the paper. This means that transverse movements relative to the forward direction and which are produced by the cam or by the carriage are to be regarded as an upstroke or as a downstroke depending on whether they are directed toward the left or right.

FIG. 3 shows a schematic view of a ballpoint pen 6 ready to write but not yet placed on the paper. Its ball 1 in the internal opening of the nib 2 of the ballpoint pen 6 is raised on all sides and is surrounded by ballpoint pen ink. The ballpoint pen ink itself is not shown for reasons of visibility. The plane passing through the center of the ball 1 normal to the axis 5 is called the equatorial plane. Between this plane and the outlet orifice of the mounting is the curved interval known as the gap 7 for the writing fluid. For ordinary ballpoint pens, the gap 7 is approximately 1.5 to 4 micrometers (difference in diameters 3 to 8 micrometers).

Shown in broken lines towards the top of FIG. 3 is an ink channel 3 supplying an intermediate accumulator of annular shape 8. Five or six ink channels are usually provided in the tip, at regular intervals around the periphery. FIGS. 3 and 4 also show the writing angle $\alpha$ (alpha), which in this case is the angle between the axis 5 of the ballpoint pen 6 and the writing surface, in the example illustrated as a sheet or piece of paper 4.

FIG. 4 shows the changes produced as soon as the writing instrument is placed on the paper 4: the ball 1 is pushed upwards and inwards in its seat in such a way that the gaps 7 available for releasing and evacuating the ink of the ballpoint pen become unequal in thickness. When the ballpoint pen moves in the direction of arrow U, the upstroke movement, only the reduced upper zone of the gap remains available for releasing the ink, while the broad lower zone of the gap is available for evacuating the excess ink.

During a movement in the direction of arrow D, the downstroke, the ball 1 moves in the direction of the rotating arrow D and relatively more ink is transported towards the paper 4 through the broader lower zone of the gap 7 between the ball 1 and the nib 2, whereas only the narrow upper zone of the gap 7 is available for evacuation of the excess ink.

To this must be added the fact that, during changes of direction at the start of the movement, very often some parts of the surface of the ball which are still short of ink from the end of the last movement come into contact with the paper in the new direction, with the result that the line may be weak or interrupted. There are also changes of direction during which parts of the ball and of the frontmost surface 9 where ink has previously built up come into contact with the paper, causing, particularly at the beginning of an upstroke, perceptible widening and blobbing of the line.

The movement of the ballpoint pen normal to the plane of illustration of FIG. 4, termed the transverse stroke, produces, as compared with the upstroke or downstroke, a gap 7 that is not very different and therefore not illustrated, but it too, depending on its length, contributes to the potential depositing of ink blobs on the paper as mentioned above.

The angle $\alpha$ (alpha) between the surface of the paper 4 and the axis 5 of the writing instrument 6 also obviously has an influence on the quality of the writing and is maintained throughout the prior-art tests at 50° to 80°, and, more preferably, at 60° to 70°. In accordance with the method of the present invention, the pen may be situated in a plane that extends normal to the plane of the paper 4 and extends within ±45° of a position parallel to the direction of movement of the pen. Thus, movements of the pen transverse to the forward direction of the paper create what may be considered upstrokes or downstrokes on the paper. Other dimensions or even variations during the test are of course conceivable, but this only concerns variants or sub-concepts of the invention.

This type of variant also includes deciding the number of back and forth movements, deciding the different speeds or changes of speeds, and selecting the ratio between the forward speed of the paper and the speed of the transverse movement. Also to be defined is the adjustment of the ratio between these speeds and the rotational movement of the writing instrument 6 about its axis 5 due to the repeatability of the results, but this is only a matter of the parameters available to the invention and has no bearing on the essence of the invention.

It is of course possible, in the method of the invention, to use supports and holders for the writing instruments which are known from the prior art. As these holders are familiar to those skilled in the art in the field of writing instrument tests, there is no need here to present these devices more precisely, but simply to draw attention to the fact that the realization of the method of the invention is naturally not restricted to the use of such devices, and that all devices capable of supporting and guiding a writing instrument that is to be tested as required by the method of the invention are suitable for carrying out this method.

Figure 5:
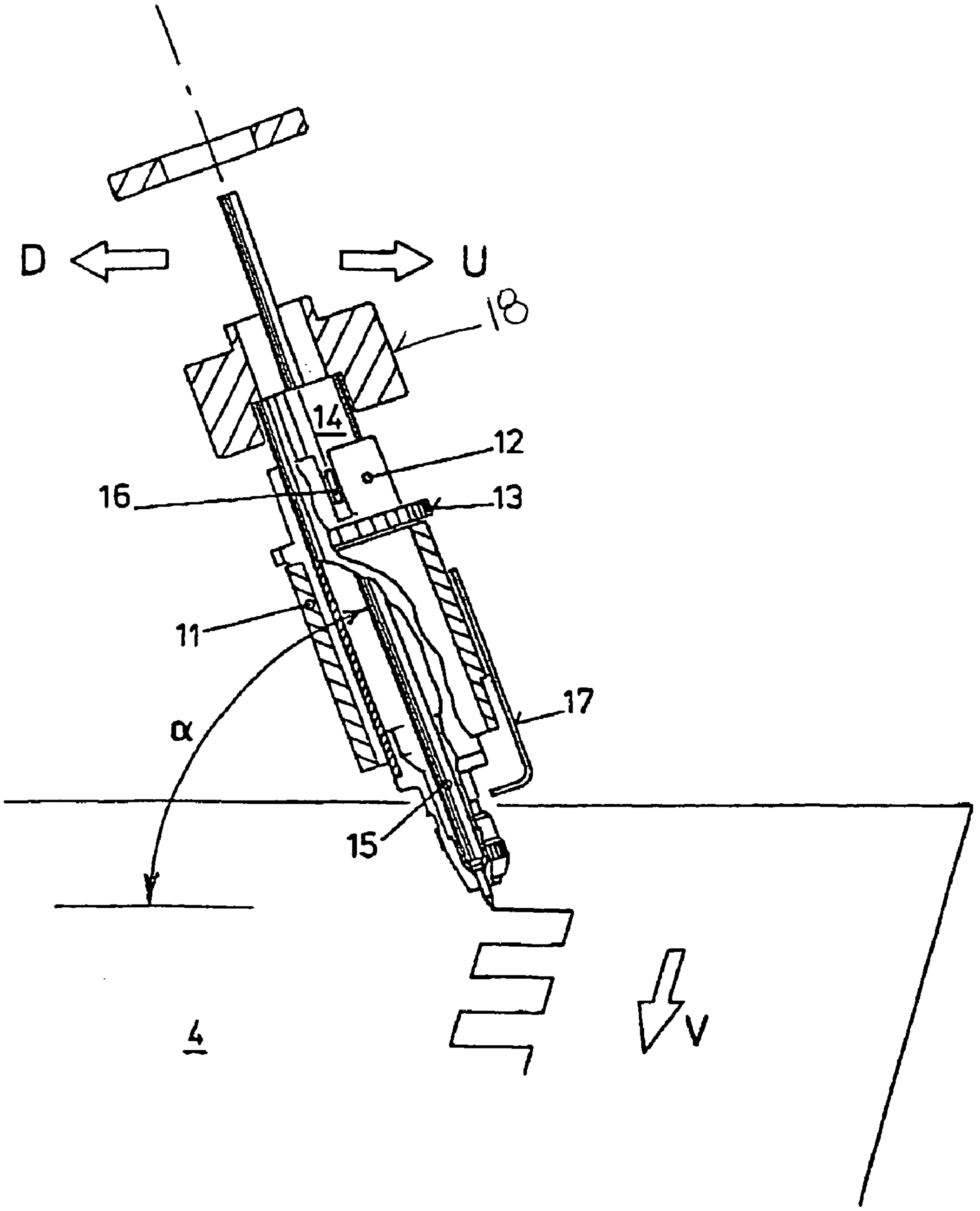
FIG. 5 shows a ballpoint pen in a holding device.

One such support is shown in an oblique view, partly in section, in FIG. 5. In this support, a holder 11 is part of a carriage (not shown) and supports inside it a sleeve 12 fitted in such a way that it can pivot. This sleeve supports, optionally in one piece, a gearwheel 13 and has a longitudinal slot through which there projects into the interior of the sleeve 12 a dog 16 belonging to a clamp 14. The clamp has, as mentioned in the introduction, a small amount of radial play and is axially movable within limits. Resting on the upper end of the clamp is an interchangeable weight 18 which sets the writing pressure at a precisely defined level. The clamp 14 holds a test sample 15 in position. The test sample has at least one ballpoint pen nib and an ink reservoir. FIG. 5 shows, schematically only, the output test line with an indication of the direction V for forward movement of the paper 4 and the U-D movement of the carriage for the upstroke or the downstroke.

Finally, FIG. 5 also shows a lifter 17 with the aid of which the test sample 15 can be raised from the paper. One lifter 17 can of course be provided in common for several test samples.

The method of the invention can also be used for lead pencils, color pencils, chalks, fountain pens and other writing instruments. For lead pencils or graphite leads in particular, it is important that there are no superpositions of writing, so that measurements with a densitometer are practicable.

What is claimed is:

1. A method for testing writing instruments on a test substrate, said method comprising:

guiding the writing instrument in a repetitive movement relative to the plane of the test substrate; and sequentially displacing the test substrate in a forward direction, wherein:

the movement of the writing instrument occurs in alternation with the forward movement of the test substrate, the writing instrument executes a back and forth movement between two predefined extreme points when the test substrate is in a stationary state, the forward movement of the test substrate takes place when the writing instrument is at the extreme points, and the writing instrument is situated in a plane that extends normal to the plane of the test substrate and extends within ±45° of a position parallel to the direction of movement of the writing instrument.

2. The method as claimed in claim 1, wherein several writing instruments are simultaneously tested.

3. The method of claim 1, wherein the writing instrument is rotated continuously about a longitudinal axis while maintaining a predetermined relationship between number of rotations and the number of back and forth movements.

4. A method for testing writing instruments, said method comprising:

moving at least one writing instrument relative to a test substrate, wherein said relative movement is composed of two partial movements, including a repetitive back and forth movement between two predefined extreme points, and a movement of progression which takes place only when the writing instrument is at the extreme points, wherein the direction of movement of the writing instrument and the forward direction of the paper lie essentially normal to each other, and wherein the writing instrument is situated in a plane that extends normal to the plane of the test substrate and extends within ±45° of a position parallel to the direction of movement of the writing instrument.

5. The method as claimed in claim 4, wherein several writing instruments are simultaneously tested.

6. The method of claim 4, wherein the writing instrument is rotated continuously about a longitudinal axis while maintaining a predetermined relationship between number of rotations and the number of back and forth movements.

7. A device for testing writing instruments, said device comprising:

a carriage configured to hold a writing instrument and being moveable when the test substrate is stationary to guide the writing instrument relative to a test substrate; and means for moving the test substrate in a forward direction; wherein:

said carriage is moveable to move the writing instrument back and forth between two predefined extreme points, said means for moving the test substrate moves the test substrate when the writing instrument is at the extreme points, the direction of movement of the writing instrument and the forward direction of the paper lie essentially normal to each other, and wherein the writing instrument is situated in a plane that extends normal to the plane that extends normal to the plane of the test substrate and extends within ±45° of a position parallel to the direction of movement of the writing instrument.

8. The device as claimed in claim 7, wherein:

several writing instruments are installed in a common carriage; and said common carriage is driven by a cam.

9. The device as claimed in claim 8, wherein said means for moving said test substrate includes a stepper motor.

10. The device as claimed in claim 7, wherein said means for moving said test substrate includes a stepper motor.

11. A method for testing writing instruments on a test substrate, said method comprising:

guiding the writing instrument in a repetitive movement relative to the plane of the test substrate; and sequentially displacing the test substrate in a forward direction, wherein:

the movement of the writing instrument occurs in alternation with the forward movement of the test substrate, the writing instrument executes when the test substrate is in a stationary state, a back and forth movement between two predefined extreme points;

the forward movement of the test substrate takes place when the writing instrument is at the extreme points; and the writing instrument is rotated continuously about a longitudinal axis while maintaining a predetermined relationship between number of rotations and the number of back and forth movements.

12. The method of claim 11, wherein the writing instrument is situated in a plane that extends normal to the plane of the test substrate and extends within ±45° of a position parallel to the direction of movement of the writing instrument.

13. A method for testing writing instruments, said method comprising moving at least one writing instrument relative to a test substrate, wherein the relative movement is composed of two partial movements including a repetitive back and forth movement between two predefined extreme points and a movement of progression which takes place only when the writing instrument is at the extreme points, wherein the direction of movement of the writing instrument and the forward direction of the paper lie essentially normal to each other, and wherein the writing instrument is rotated continuously about a longitudinal axis while maintaining a predetermined relationship between number of rotations and the number of back and forth movements.

14. The method of claim 13, wherein the writing instrument is situated in a plane that extends normal to the plane of the test substrate and extends within ±45° of a position parallel to the direction of movement of the writing instrument.

* * * * *